No. 828,620. PATENTED AUG. 14, 1906.
D. H. MARTIN.
GAMBREL.
APPLICATION FILED NOV. 10, 1905.
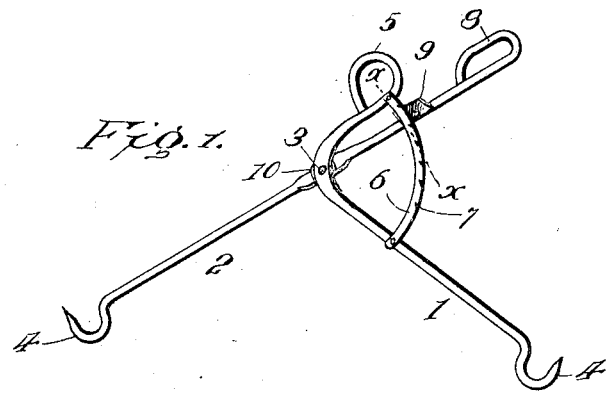
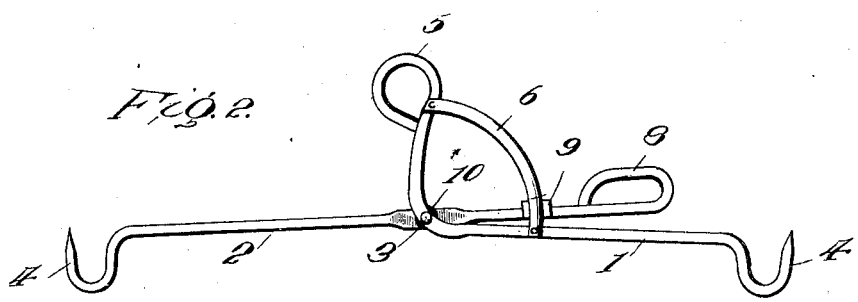
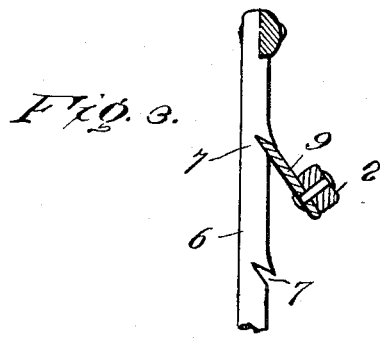
Inventor
David H. Martin,
Witnesses
By ........., Attorneys.

UNITED STATES PATENT OFFICE.

DAVID H. MARTIN, OF KAPPA, INDIANA.

GAMBREL.

No. 828,620.  Specification of Letters Patent.  Patented Aug. 14, 1906.

Application filed November 10, 1905. Serial No. 286,747.

*To all whom it may concern:*

Be it known that I, DAVID H. MARTIN, a citizen of the United States, residing at Kappa, in the county of Howard and State of Indiana, have invented certain new and useful Improvements in Gambrels, of which the following is a specification.

This invention relates to a novel device for suspending the carcass of an animal while same is cooling or being dressed, and more particularly to an improved form of gambrel. Where the common type of wooden gambrel is employed, no adjustment is possible for the various sizes of animals which are handled, and it not infrequently happens that the carcass drops upon the ground, thereby causing a great amount of trouble and decreasing the market value of the meat.

The object of this invention has accordingly been to provide a gambrel which is adjustable for the different sizes of animals which it is adapted to handle and which is so constructed as to remove all possibility of their dropping upon the ground.

For a full description of the invention and the merits thereof and also to acquire a knowledge of the details of construction of the means for effecting the result reference is to be had to the following description and accompanying drawings, in which—

Figure 1 is a perspective view of my improved form of gambrel, showing same in the position which would be taken for the small or medium sized animals. Fig. 2 is a side view showing the suspension-hooks as thrown apart to the maximum extent. Fig. 3 is a transverse sectional view on the line X X of Fig. 2 and shows the operation of the rack and spring-pawl.

Corresponding and like parts are referred to in the following description and indicated in all the views of the drawings by the same reference characters.

The gambrel as constructed by me comprises, essentially, two complemental members 1 and 2, which are flattened and pivoted together at an intermediate point 3, one of said members, 1, being bent to form arms which are at approximately right angles to each other and meet at the pivot-point 3. The extremities of the longer arm of each of the members 1 and 2 are bent downwardly and then upwardly to form suspension-hooks 4. The opposite end of the member 1 is looped upon itself to form an eye 5, by means of which the device is suspended, and the two arms of this member are connected by a bar 6, which is provided with a series of V-shaped notches 7 and is preferably bent in the form of an arc having the pivot-point 3 as its center of curvature. The short arm of the member 2 passes over this rack-bar 6 and is provided at its end with a handle 8, formed by looping the material upon itself. The portion of the member 2 which moves over the rack 6 is recessed and provided with a laterally-disposed piece of spring metal 9, which engages with the notches 7 and forms a spring-pawl. These notches 7 are so formed that the spring-pawl 9 will slip over them when the handle 8 is pushed downward, but will engage with them upon any upward movement of the handle. In the construction of the device it may be found desirable to interpose a washer 10 between the complemental members in order to prevent any binding thereof, which might otherwise interfere with their free operation.

In the application of the device it is intended to construct the gambrel in different sizes for the various animals which are to be handled—such as hogs, cattle, &c.—and it will be readily apparent that the distance between the suspending-hooks 4 can be easily adjusted to suit the different sizes of the various kinds of animals. When it is desired to employ the gambrel, the suspending-hooks 4 are swung around so that they can be readily inserted in the hind legs of the animal in the usual manner. The handle 8 is then pulled downward, so as to force the hooks 4 apart until the sides of the animal are separated the required amount. This operation is greatly facilitated, owing to the fact that the spring-pawl 9 slips over the notches 6 when the handle 8 is pushed downward and engages with the notches 7 to prevent any upward movement of the handle. When it is desired to remove the gambrel, it is simply necessary to pull the handle 8 outward, so as to throw the spring-pawl 9 out of engagement with rack 6.

Having thus described the invention, what is claimed as new is—

In a gambrel, the combination of two complemental members pivoted together at an intermediate point, one of the complemental members being straight, while the opposite complemental member comprises two integral arms arranged at an angle to each other, a rack-bar connecting the said arms of the second-mentioned complemental member, and a laterally-disposed member carried by the first-mentioned straight complemental member and engaging with the rack-bar.

In testimony whereof I affix my signature in presence of two witnesses.

DAVID H. MARTIN. [L. S.]

Witnesses:
L. W. HAWKINS,
AMOS HUDDLESTON.